United States Patent Office

3,470,237
Patented Sept. 30, 1969

3,470,237
N-METHYL-2-DIMETHYLAMINO-5-CHLORO BENZHYDRYLCARBAMATES
Sidney B. Richter and David P. Mayer, Chicago, Ill., assignors to Velsicol Chemical Corporation, Chicago, Ill., a corporation of Illinois
No Drawing. Continuation-in-part of application Ser. No. 454,688, May 10, 1965. This application May 12, 1967, Ser. No. 637,935
The portion of the term of the patent subsequent to Sept. 5, 1984, has been disclaimed
Int. Cl. C07c 101/00, 101/12, 101/18
U.S. Cl. 260—482                                       1 Claim

ABSTRACT OF THE DISCLOSURE

New compounds selected from the group consisting of N-methyl-2-dimethylamino-5-chloro-2'-methylbenzhydrylcarbamate, N - methyl - 2 - dimethylamino - 5 - chloro-4' - methylbenzhydrylcarbamate, N - methyl - 2 - dimethylamino - 4',5 - dichlorobenzhydrylcarbamate and N - methyl - 2 - dimethylamino - 3',5 - dichlorobenzhydrylcarbamate. These compounds are useful as miticides.

---

This application is a continuation-in-part of our copending application Ser. No. 454,688 filed May 10, 1965 now U.S. Patent No. 3,340,294.

This invention relates to the four new chemical compositions N - methyl-2-dimethylamino-5-chloro-2'-methylbenzhydrylcarbamate, N - methyl - 2 - dimethylamino - 5-chloro - 4' - methylbenzhydrylcarbamate, N - methyl-2-dimethylamino - 4',5 - dichlorobenzhydrylcarbamate and N-methyl - 2 - dimethylamino - 3',5 - dichlorobenzhydrylcarbamate.

The compounds of the present invention are exceptionally active as acaricides.

The manner in which the new compounds of the persent invention can be prepared readily is illustrated in the following examples:

EXAMPLE 1

Preparation of 2-dimethylamino-5-chloro-2'-methylbenzhydrol

Para-methylbenzoyl chloride (17.4 grams) was heated with stirring to about 120° C. in a glass reaction flask equipped with mechanical stirrer, internal thermometer and reflux condenser. Para-chloroaniline (6.4 grams) was then added to the reaction flask and the mixture heated to about 180° C. Dry zinc chloride (6.4 grams) was added and the reaction mixture heated to a temperature of from about 225 to about 230° C. for a period of about 2 hours. After this time the reaction mixture was cooled to about 120° C. A mixture of glacial acetic acid (40 ml.) and hydrogen bromide (40 ml.; assay 48%) was added to the reaction mixture and refluxed for a period of about 17 hours. After this time the reaction mixture was concentrated under reduced pressure and hydrochloric acid (100 ml.; 3 N) was added. The mixture was heated to boiling and was decanted. The residue was heated to reflux for about 40 minutes in sulfuric acid (32 ml., 75% v./v.) and poured over ice. The resulting mixture was extracted twice with ether and the combined ether portions washed with 3 N hydrochloric acid, with 5 N sodium hydroxide, and with water. The extract was dried over magnesium sulfate, filtered and evaporated to yield a red viscous oil. The oil was distilled to yield 2-amino-5-chloro-2'-methylbenzophenone having a boiling point of 130 to 140° C. at 0.02 mm. Hg pressure.

2 - amino - 5 - chloro-2'-methylbenzophenone (8 gms.), prepared above, and trimethylphosphate (12 gms.) were charged into a 250 ml. glass reaction flask equipped with stirrer, thermometer and reflux condenser. The reaction mixture was heated, with stirring, at about 160° C. for a period of about 2½ hours. After this time the reaction mixture was cooled to 120° C. and a solution of sodium hydroxide (10 gms.) in water (75 ml.) was added. The reaction mixture was then refluxed for about 1½ hours and let stand at room temperature overnight. The reaction mixture was then extracted with ether, the ether extract dried over magnesium sulphate, filtered and evaporated. The residue was vaccum distilled to yield 2-dimethylamino-5-chloro-2'-methylbenzophenone as a yellow liquid.

A solution of lithium aluminum hydride (1.5 gms.) in ether (100 ml.) was charged, with stirring, into a 500 ml. glass reaction flask equipped with stirrer, interial thermometer and reflux condenser. A solution of 2-dimethylamino - 5 - chloro-2'-methylbenzophenone (5.9 gms.) in ether (100 ml.) was then slowly added to the flask over a period of about 15 minutes. The reaction mixture was then heated at reflux for a period of about 3½ hours. The reaction mixture was cooled to room temperature. A solution of sodium potassium tartrate (1.5 gms.) in water (6.0 ml.) was added dropwise, with stirring, to the cooled, reaction mixture. The resulting mixture was allowed to stand at room temperature overnight and was distilled under reduced pressure to yield 2-dimethylamino-5-chloro-2'-methylbenzhydrol having a boiling point of 143 to 152° C. at 0.15 mm. Hg pressure.

EXAMPLE 2

Preparation of N-methyl-2-dimethylamino-5-chloro-2'-methylbenzhydrylcarbamate

2 - dimethylamino - 5-chloro-2'-methylbenzhydrol (2.3 gms.), methylisocyanate (2.0 ml.), dibutyl tin diacetate (1 drop) and benzene (50 ml. were placed into a 250 ml. glass reaction flask equipped with mechanical stirrer, internal thermometer and reflux condenser. The reaction mixture was refluxed with stirring for a period of about 17 hours. After this time the mixture was heated under reduced pressure to remove the benzene. The residue was held under 0.05 mm. Hg pressure for a period of about 1 hour to yield N-methyl-2-dimethylamino-5-chloro-2'-methylbenzhydrylcarbamate as a pale yellow liquid having the following elemental analysis.

Analysis for $C_{18}H_{21}ClN_2O_2$.—Theoretical: C, 64.95%; H, 6.56%; N, 8.42%. Found: C, 66.02%; H, 7.56%; N, 9.09%.

EXAMPLE 3

Preparation of 2-dimethylamino-5-chloro-4'-methylbenzhydrol

Para-methylbenzoyl chloride (33.3 gms.) was heated with stirring to about 120° C. in a glass reaction flask, equipped with mechanical stirrer, internal thermometer and reflux condenser. Para-chloroaniline (12.8 gms.) was then added to the reaction flask and the mixture heated to about 180° C. Dry zinc chloride (17.4 gms.) was added, and the reaction mixture heated to a temperature of from about 220 to 240° C. for a period of about 2 hours. After this time the reaction mixture was cooled to about 120° C. A mixture of glacial acetic acid (40 ml.) and hydrogen bromide (40 ml.; assay 48%) was added, and refluxed overnight. After this time the reaction mixture was concentrated under reduced pressure by removing excess solvent. The concentrate was refluxed for about 40 minutes in sulfuric acid (64 ml.; 75% v./v.) and poured over crushed ice. The resulting mixture was extracted with ether and the ether extract washed first with sodium hydroxide (100 ml.; 3 N) and then with water. The extract was dried over magnesium sulfate, filtered and evaporated. The residue was distilled to yield 2-amino-5-chloro-4'-methylbenzophenone.

2-amino-5-chloro-4'-methylbenzophenone (8.4 gms.), formic acid (23 ml.) and formaldehyde (15 ml.; 38%) were charged into a 250 ml. glass reaction flask equipped with mechanical stirrer, reflux condenser and internal thermometer. The reaction mixture was refluxed for a period of about 17 hours. After this time the mixture was diluted with water (200 ml.) and extracted two times with ether. The two ether extracts were combined and washed first with aqueous sodium hydroxide (100 ml.; 3 N) and then with water. The extract was dried over magnesium sulfate, filtered and evaporated. The residue was distilled to yield 2-dimethylamino - 5 - chloro-4'-methylbenzophenone as a yellow liquid having a boiling point of 136 to 141° C. at 0.02 mm. Hg pressure.

A solution of lithium aluminum hydride (1.5 gms.) in ether (100 ml.) was charged, with stirring, into a 250 ml. glass reaction flask equipped with stirrer, internal thermometer and reflux condenser. A solution of 2-dimethylamino-5-chloro-4'-methylbenzophenone (7.0 gms.) was then slowly added to the flask over a period of about 15 minutes. The reaction mixture was heated at reflux with continuous stirring for a period of about 6 hours. The reaction mixture was cooled to room temperature. A solution of sodium potassium tartrate (1.5 gms.) in water (6 ml.) was added dropwise, with stirring, to the cooled reaction mixture. The resulting mixture was filtered, the filter cake washed with ether. The filtrate was dried and evaporated to yield a liquid as the residue. The residue was distilled under vacuum to yield 2-dimethylamino-5-chloro-4'-methylbenzhydrol having a boiling point of 132 to 136° C. at 0.02 mm. Hg pressure.

EXAMPLE 4

Preparation of N-methyl-2-dimethylamino-5-chloro-4'-methylbenzhydrylcarbamate

2 - dimethylamino - 5 - chloro - 4' - methylbenzhydrol (2.0 gms.), methyl isocyanate (3.0 ml.), dibutyl tin diacetate (1 drop) and ether (50 ml.) were placed in a 100 ml. glass reaction flask. The reaction mixture was allowed to stand at room temperature for a period of about 3 days. After this time the ether was removed under reduced pressure at 60° C. The residue was held for about 1 hour at 0.02 mm. Hg pressure and 60° C. to yield N - methyl - 2 - dimethylamino - 5 - chloro - 4'-methylbenzhydrylcarbamate having a melting point of 83.5 to 86° C. and the following elemental analysis.

Analysis for $C_{18}H_{21}ClN_2O_2$.—Theoretical: C, 64.95%; H, 6.36%; Cl, 10.65%. Found: C, 64.34%; H, 6.37%; Cl, 11.13%.

EXAMPLE 5

Preparation of 2-dimethylamino-4',5-dichlorobenzhydrol 2-amino-4',5-dichlorobenzophenone (8 gms.), formic acid (23 ml.), and formaldehyde (15 ml.; 38%) were charged into a 250 ml. glass reaction flask equipped with mechanical stirrer, internal thermometer and reflux condenser. The reaction mixture was refluxed, with continuous stirring, for a period of about 17 hours. After this time the reaction mixture was diluted with water (200 ml.) and extracted twice with ether. The two ether extracts were combined and washed with aqueous sodium hydroxide (100 ml.; 3 N) and water. The extract was dried over magnesium sulfate, filtered and evaporated on a steam bath. The residue was vacuum distilled to yield 2-dimethylamino-4',5-dichlorobenzophenone as a yellow liquid having a boiling point of 140 to 145° C. at 0.05 mm. Hg pressure.

A solution of lithium aluminum hydride (1.5 gms.) in ether (100 ml.) was charged, with stirring, into a 500 ml. glass reaction flask equipped with stirrer, internal thermometer, and reflux condenser. A solution of 2-dimethylamino-4',5-dichloro-benzophenone (7.1 gms.) in ether (100 ml.) was then slowly added to the flask over a period of about 15 minutes. The reaction mixture was heated at reflux for a period of about 6½ hours. The reaction mixture was cooled to room temperature. A solution of sodium potassium tartrate (1.5 gms.) in water (6 ml.) was added dropwise, with stirring, to the cooled reaction mixture. The resulting mixture was filtered and the filter cake washed with ether. The filtrate was dried and evaporated to yield a liquid as the residue. The residue was distilled under vacuum to yield 2-dimethylamino-4',5-dichlorobenzhydrol having a boiling point of 150 to 155° C. at 0.02 mm. Hg pressure.

EXAMPLE 6

Preparation of N-methyl-2-dimethylamino-4',5-dichlorobenzhydrylcarbamate 2-dimethylamino-4',5-dichlorobenzhydrol (2.0 gms.), methyl isocyanate (2.0 ml.), dibutyl tin diacetate (1 drop) and ether (50 ml.) were placed in a glass reaction flask. The reaction mixture was allowed to stand at room temperature for about 3 days. After this time the ether was removed under reduced pressure in a rotary evaporator. The residue was triturated with pentane yielding a white solid. The solid was recrystallized from ethanol to yield N-methyl-2-dimethylamino-4',5-dichlorobenzhydrylcarbamate having a melting point of 94 to 97° C. and having the following elemental analysis.

Analysis for $C_{17}H_{18}Cl_2N_2O_2$.—Theoretical: C, 57.80%; H, 5.14%; N, 7.93%. Found: C, 58.17%; H, 5.28%; N, 7.92%.

EXAMPLE 7

Preparation of 2-dimethylamino-3',5-dichlorobenzophenone 2-amino-3',5-dichlorobenzophenone (8 gms.), formic acid (23 ml.) and formaldehyde (15 ml.; assay 38%) were charged into a 250 ml. glass reaction flask equipped with mechanical stirrer, internal thermometer and reflux condenser. The reaction mixture was refluxed, with continuous stirring, for a period of about 17 hours. After this time the reaction mixture was diluted with water (200 ml.) and extracted twice with ether. The two other extracts were combined and washed first with aqueous sodium hydroxide (100 ml.; 3 N), and then with water. The extract was dried over magnesium sulfate, filtered and evaporated on a steam bath. The residue was vacuum distilled to yield 2-dimethylamino-3',5-dichlorobenzophenone as a yellow liquid having a boiling point of 130 to 135° C. at 0.02 mm. Hg pressure.

A solution of lithium aluminum hydride (2.0 gms.) in ether (100 ml.) was charged, with stirring, into a 500 ml. glass reaction flask equipped with stirrer, internal thermometer and reflux condenser. A solution of 2-dimethylamino-3',5-dichlorobenzophenone (11.7 gms.) in ether (150 ml.) was then slowly added to the flask over a period of about 15 minutes. The reaction mixture was heated at reflux for a period of about 17 hours. A solution of sodium potassium tartrate (2.0 gms.) in water (8 ml.) was added dropwise, with stirring, to the cooled reaction mixture. The resulting mixture was filtered and the filter cake washed with ether. The filtrate was dried and evaporated to yield a liquid as the residue. The reside was distilled under vacuum to yield 2-dimethylamino-3′,5-dichlorobenzhydrol having a boiling point of 144 to 148° C. at 0.02 mm. Hg pressure.

EXAMPLE 8

Preparation of N-methyl-2-dimethylamino-3′,5-dichlorobenzhydrylcarbamate 2-dimethylamino-3′,5-dichlorobenzhydrol (2.0 gms.), methyl isocyanate (2.0 ml.), dibutyl tin diacetate (1 drop) and ether (50 ml.) were placed in a reaction flask. The reaction mixture was allowed to stand for a period of about 3 days. After this time the ether was removed under reduced pressure in a rotary evaporator at 60° C. over a period of about 1 hour. The residue was triturated with pentane to yield a white solid. The solid was recrystallized from ethanol to yield N-methyl-2-dimethylamino-3′,5-dichlorobenzhydrylcarbamate having a melting point of 94.0 to 96.5° C. and having the following elemental analysis.

Analysis for $C_{17}H_{18}Cl_2N_2O_2$.—Theoretical: C, 57.80%; H, 5.14%; N, 7.93%. Found: C, 57.82%; H, 5.28%; N, 7.93%.

The utility of the compounds of the present invention as acaricides was illustrated in experiments for the control of the two spotted spider mite. In these experiments, the test compounds were formulated by dissolving them in acetone and dispersing the solutions in water containing small amounts of polyoxyalkylene derivatives of monolaurate and monoleate emulsifiers. The above formulations were then applied to plants infested with 50 to 100 adults of the mites and held for five days. Thereafter adult mortality was observed. The results were as follows:

| Test compound | Concentration of test compound in p.p.m. | Percent mortality |
|---|---|---|
| N-methyl-2-dimethylamino-5-chloro-2′-methylbenzhydrylcarbamate | 3,500 | 100 |
| Do | 1,000 | 100 |
| Do | 100 | 100 |
| Do | 10 | 100 |
| N-methyl-2-dimethylamino-5-chloro-4′-methylbenzhydrylcarbamate | 3,500 | 100 |
| Do | 1,000 | 100 |
| Do | 100 | 100 |
| Do | 10 | 86 |
| N-methyl-2-dimethylamino-4′,5-dichlorobenzhydrylcarbamate | 3,500 | 100 |
| Do | 1,000 | 100 |
| Do | 100 | 97 |
| Do | 10 | 73 |
| N-methyl-2-dimethylamino-3′,5-dichlorobenzhydrylcarbamate | 3,500 | 99 |
| Do | 1,000 | 93 |
| Do | 100 | 76 |
| K | 10 | 12 |

We claim:
1. The compounds selected from the group consisting of N - methyl - 2 - dimethylamino - 5 - chloro - 2′-methylbenzhydrylcarbamate, N - methyl - 2 - dimethylamino - 5 - chloro - 4′ - methylbenzhydrylcarbamate, N-methyl - 2 - dimethylamino - 4′,5 - dichlorobenzhydrylcarbamate and N-methyl-2-dimethylamino-3′,5-dichlorobenzhydrylcarbamate.

References Cited

UNITED STATES PATENTS 2,430,586   11/1947   Ruthruff et al. _____260—618
2,530,653   11/1950   De Benneville et al. 260—487 XR
3,340,294   9/1967    Richter et al. _____ 260—482

LORRAINE A. WEINBERGER, Primary Examiner
ALBERT P. HALLUIN, Assistant Examiner

U.S. Cl. X.R.

52—8; 272—18; 350—125, 129; 352—36